United States Patent Office 2,831,837
Patented Apr. 22, 1958

2,831,837

POLYUNSATURATED DERIVATIVES OF POLYHYDRIC ALCOHOL AMINES AND POLYMERS

Theodore W. Evans, Oakland, and Seaver A. Ballard, Orinda, Calif., assignors to Shell Development Company, New York, N. Y., a corporation of Delaware No Drawing. Application October 31, 1955
Serial No. 544,088

16 Claims. (Cl. 260—78.5)

This invention relates to a new class of nitrogen-containing organic compounds. More particularly, the invention relates to new poly-unsaturated derivatives of polyhydric alcohol amines and to the use of the derivatives, particularly in the preparation of valuable polymeric products.

Specifically, the invention provides new and particularly useful polyunsaturated derivatives of polyhydric alcohol amines comprising ethylenically unsaturated ethers and preferably the alkenyl ethers of N-substituted alkane polyol amines wherein the substituent on the nitrogen atom possesses a terminal $>C=CH_2$ group. The invention further provides insoluble infusible polymers obtained by polymerizing these particular derivatives alone or with other ethylenically unsaturated monomers.

This application is a continuation-in-part of our application Serial No. 234,162, filed June 28, 1951, now abandoned.

It is an object of the invention to provide a new class of nitrogen-containing organic compounds. It is a further object to provide a new class of polyunsaturated derivatives of polyhydric alcohol amines and a method for their preparation. It is a further object to provide new polyunsaturated derivatives of polyhydric alcohol amines which possess properties which make them particularly useful and valuable in industry. It is a further object to provide new polyunsaturated derivatives of polyhydric alcohol amines which may be polymerized to form valuable insoluble infusible polymeric products. It is a further object to provide new polyunsaturated derivatives of polyhydric alcohol amines which are useful alone or in the form of salts as curing agents for epoxy compounds. It is a further object to provide new polyunsaturated derivatives of polyhydric alcohol amines that may be used to produce valuable polyamide-polyester type products. Other objects and advantages of the invention will be apparent from the following detailed description thereof.

It has now been discovered that these and other objects may be accomplished by the novel products of the invention comprising ethylenically unsaturated ethers and preferably alkenyl ethers of N-substituted alkane polyol amines wherein the substituent on the nitrogen atom possesses a terminal $>C=CH_2$ group. It has been found that these polyunsaturated compounds can be polymerized to form hard insoluble infusible products which are particularly useful in the preparation of coatings, laminates, pottings and the like. It has also been found that these compounds and their salts are good curing agents for polyepoxy compounds, such as the commercially available polyglycidyl ethers of polyhydric phenols or polyhydric alcohols. They are particularly unique in this latter capacity as they can act not only to cure the polyepoxide and thereby enter into the resin but may also undergo polymerization with any unsaturated monomer that may be present. The new compounds may also be reacted with polybasic acids or anhydrides to form alkyd-type resins which may be subsequently cured through the polyethylenic groups to form excellent surface coating compositions.

The polyethylenically unsaturated compounds as described herein are distinguished in structure and in properties from monoethylenically unsaturated hydroxy amine ethers such as described in U. S. 2,631,995, as shown in the examples at the end of the specification.

The N-substituted alkane polyol amines wherein the substituent on the nitrogen atom possesses a terminal $>C=CH_2$ group which are used in preparation of the new compounds of the invention may be exemplified by the following: N-allyl-1-amino-2,3-propanediol, N-allyl-1-amino-2,3-butanediol, N-methallyl-2-amino-1,3-propanediol, N-chloroallyl-1-amino-2,5-octanediol, N-(2-butenyl)-1-amino-3,5-hexanediol, N-ethallyl-2-amino-1,3-propanediol, N-(4-allylphenyl)-1-amino-2,3-propanediol, N(allyloxyethyl)-1-amino-2,6-hexanediol, N(allyloxyethyl)-1-amino-2,3-propanediol, N-(3-allyloxy-2-hydroxypropyl)-1-amino-2,3-propanediol, N-(3-propenoyl)-1-amino-2,6-hexanediol, N-(carballyloxy)-1-amino-2,4-pentanediol and N-allyl-1-amino-2,4,5-octanetriol.

Preferred N-substituted alkane polyol amines are the N-alkenyl substituted alkane polyol monoamines, N-alkenyloxyalkyl substituted alkane polyol monoamines, N-alkenyloxyhydroxyalkyl substituted alkane polyol monoamines, the N-carbalkenyloxy substituted alkane polyol monoamines and the N-alkenoyl substituted alkane polyol monoamines. The alkane polyol monoamines used in preparing these preferred compounds are preferably the alkane diols and alkanetriols containing not more than 12 carbon atoms.

Especially preferred are the N-alkenyl alkanediol monoamines and the N-(alkenyloxyhydroxyalkyl) alkanediol monoamines wherein the alkenyl groups and alkyl groups in the substituent attached to nitrogen contain up to 6 carbon atoms and the alkanediol portion of the molecule contains from 3 to 8 carbon atoms.

The alcohols used to etherify the above-described N-substituted alkane polyol amines are the monohydric alcohols containing at least one ethylenic linkage, i. e. alcohols of the formula ROH wherein R is an ethylenically unsaturated radical. The alcohols may be open-chain or cyclic and may be substituted with substituents, such as, for example halogen atoms, alkoxy radicals and the like.

One group of the above-described unsaturated alcohols comprise the alkenol-1 or vinyl alcohols. Many of these alcohols have never been isolated and require special methods known to the art for preparation of their ethers. These alcohols may be exemplified by vinyl alcohol, 1-isopropenol, 1-hexenol, 1-butenol, 3-chlorobutenol, 3-bromo-1-hexenol, 3-ethyl-1-pentenol.

Another group of the unsaturated alcohols comprises the beta,gamma-ethylenically unsaturated alcohols which are sometimes referred to as "allyl-type" alcohols. They may be exemplified by allyl alcohols, crotyl alcohol, 3-chloro-2-butenol, cinnamyl alcohol, 2,4-hexadienol, 2-methyl-2-hexenol, 5-chloro-2-octenol, 3-cyclohexyl-2-octenol, 2,4-dichloro-2-hexenol and the like.

Particularly preferred unsaturated alcohols are the 1-alkenol and 2-alkenols containing from 2 to 12 carbon atoms. Of special interest are the 2-alkenols containing from 3 to 10 carbon atoms.

The unsaturated ethers of the invention are obtained by etherifying at least one and at most all but one hydroxyl group of the aforedescribed polyhydric alcohol amines with one or more of the above-described ethylenically unsaturated alcohols. These polyethylenically unsaturated compounds may be exemplified by the following: N-allyl-1-amino-3-allyloxy-2-propanol, N-ethallyl-1-amino-2-methallyloxy-3-propanol, N-chloroallyl-1-amino-2-ethallyloxy-6-hexanol, N-butenyl-1-amino-3-chloroallyloxy-5-dodecanol, N-methallyl-2-amino-3-butenyloxy-5-pentanol, N-(4-allylphenyl) 1 - amino-2-methallyloxy- 3 -propanol, N-ethallyl-2-amino-1-cyclohexenyloxy-3-propanol, N(allyloxyethyl)-1-amino -2- allyloxy-3-propanol, N-(3-allyloxy-2-hydroxypropyl)-1-amino - 2 - allyloxy-3-propanol, N-(3-propenoyl)-1-amino -6- allyloxy-2-hexanol, N-(carballyloxy)-1-amino -4- chloroallyloxy-2-pentanol, N-allyl-1-amino-2,4-diallyloxy-5-octanol, N-(4-allylphenyl)-1-amino - 3 - ethallyloxy-5,6-octanediol, N-chloroallyl-1-amino-2-vinyloxy-4,5-dodecanediol, N-carballyloxy- 1 -amino-2-hexenyl-5-hexanol and N-(3-allyloxy-2-hydroxybutyl)-1-amino-2-vinyloxy-4-hexanol.

Preferred ethylenically unsaturated ethers of the invention comprise the monoalkenyl ethers of the N-alkenyl substituted alkane polyol monoamines, the monoalkenyl ethers of the N-alkenyloxyalkyl substituted alkane polyol monoamines, the monoalkenyl ethers of the N-alkenyloxyhydroxyalkyl substituted alkane polyol monoamines, the monoalkenyl ethers of the N-carbalkenyloxy substituted alkane polyol monoamines and the monoalkenyl ethers of the N-alkenoyl substituted alkane polyol monoamines wherein the alkenyl radicals contain from 3 to 12 carbon atoms and the alkane polyol monoamine portion of the molecule contains up to 10 carbon atoms.

Of special interest are the diethylenically unsaturated ethers of the general formula

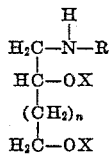

wherein R is an alkenyl radical, alkenylhydroxyalkyl radical, alkenyloxyalkyl radical, carbalkenoxy radical or aralkenoyl radical, each group preferably containing no more than 8 carbon atoms, one X is hydrogen the other is an alkenyl radical containing up to 8 carbon atoms and $n$ is an integer from 0 to 4.

The novel polyunsaturated ethers of the present invention may be prepared by any suitable method. They may be prepared, for example, by etherifying the above-described N-substituted alkane polyol amines with the desired unsaturated alcohol according to conventional methods. The etherification may be accomplished by reacting the alkane polyol derivative with the unsaturated alcohol in the presence of a catalyst, such as sulfuric acid, or alternativetly by reacting a halo-substituted derivative of either reactant with the other reactant in the presence of a suitable catalyst. The etherification is preferably accomplished by heating a halo-substituted derivative of the N-substituted alkane polyol amine with the desired alcohol in the presence of a catalyst, such as a fluorine-containing catalyst as hydrofluoric acid. In this type of reaction, the reactants are preferably employed in stoichiometric quantities, e. g., one mole of unsaturated alcohol for every ether group to be formed on the N-substituted alkane polyol amine molecule. If desired, the reaction may be accomplished in the presence of diluents or solvents, such as benzene, toluene and the like. Upon completion of the reaction, the catalyst and whatever other acidity may have developed may be neutralized by treating the reaction mixture with a basic-acting substance and then the desired product separated by any suitable means, such as fractional distillation, filtration and the like.

It is also possible, and in many cases preferred, to prepare the novel polyunsaturated ethers of the N-substituted alkane polyol amines by employing a derivative of the unsaturated ester of the alkane polyol amine, such as an epoxide derivative, as the starting material and reacting that compound with a nitrogen-containing derivative possessing an ethylenic linkage in the presence of a suitable catalyst. N-allyl-1-amino-3-allyloxy-2-propanol may be prepared by this method, for example, by reacting glycidyl allyl ether with allylamine.

The nitrogen-containing derivative possessing the ethylenic linkage which may be used in this type of preparation may be exemplified by the following: allyl amine, allyl ether of ethanol amine, methallyl ether of butanol amine, acrylic acid amide, alkyl esters of carbamic acid, 1-amino-3-allyloxy-2-propanol and the like.

The derivatives of the unsaturated ethers of the polyhydric alcohols used in this reaction may be exemplified by glycidyl allyl ether, allyl ether of 3,4-epoxybutanol-1, allyl ether of 2,3,4,5-diepoxypentanol-1, methallyl ether of 1,2,5,6-diepoxyhexanol-3, chloroallyl ether of alpha-ethyl glycidol and the oleyl ether of beta-methyl glycidol, beta-methallyl ether, allyl ether of 3,4-epoxybutanol-1, allyl ether of 2,3,4,5-diepoxy pentanol-1, methallyl ether of 1,2,5,6-diepoxyhexanol-3, chlorallyl ether of alpha-ethyl glycidol, and the oleyl ether of beta-methyl glycidol.

The amount of the nitrogen-containing derivative and the unsaturated ether to be employed in this type of reaction will vary over a considerable range depending upon the type of products desired. If the unsaturated ether of the alkane polyol is to react with only one of the hydrogen atoms on the amino group of the nitrogen derivative, the reactants may be employed in approximately equimolecular quantities or the nitrogen-containing derivative may be employed in slight excess. If, however, the unsaturated ether of the alkane polyol is to react with two of the hydrogen atoms on the amino group the unsaturated ether is preferably employed in a double molar quantity. On the other hand, if two amino groups are to be formed on the unsaturated ether molecule, the nitrogen-containing derivative may be employed in a double molar quantity. The exact amount to be used can readily be determined, however, by a consideration of the chemical reactions involved in each individual case.

The reaction between the unsaturated ether of the alkane polyol and the nitrogen-containing derivative is preferably accomplished in the presence of catalytic material, such as the alkali or alkaline earth metals, alkali metal acid sulfates as potassium hydrogen sulfate and sodium hydrogen sulfate, Friedel-Crafts catalysts such as the anhydrous chlorides and bromides of aluminum and zinc, and the closely related boron trifluorides and its coordination complexes with oxygenated organic compounds as the ethers, esters, alcohols and ketones. The quantity of the catalyst employed will generally be quite small and usually vary between 0.01% to about 5% by weight of the reactants. Preferred quantities vary between 0.01% and 2% by weight.

As the reaction is generally exothermic, it is desirable to add the unsaturated ether of the polyhydric alcohol slowly in small proportions and employ solvents or diluents in the reaction medium, such as benzene, toluene, dioxane, and the like.

The temperature at which the reaction is carried out will vary with the various reactants but will generally remain below about 80° C. Preferred temperatures vary between 20° C. and 70° C. The reaction may generally be carried out effectively at atmospheric pressures but subatmospheric or superatmospheric pressures may be employed if desired or necessary.

Upon completion of the reaction, the mixture is treated with a basic-acting substance to neutralize any acid that may be present and the desired product is then recovered by any suitable means, such as filtration, solvent extraction, distillation, and the like.

Still a further method of preparation is to form the amino-substituted unsaturated ether of the alkane polyol by using ammonia in the aforementioned process as the nitrogen-containing derivative and then further reacting this amine. Thus, N-carballyloxy-1-amino-3-allyloxypropanol may be prepared by reacting 1-amino-3-allyloxy-2-propanol with allyl chloroformate. N-(propenoyloxy) 1-amino-3-allyloxy propanol can also be prepared by this method by reacting 1-amino-3-allyloxy-2-propanol with acrylic acid.

The ethylenically unsaturated ethers of the N-substituted alkane polyamines of the present invention vary from fluid water white liquids to waxy solids. They possess a plurality of ethylenic groups, at least one hydroxyl group and an amine nitrogen atom and may be further reacted through one or more of these groups. The compounds may, for example, be polymerized through the ethylenic groups to form hard insoluble infusible products which find wide utility in the form of pottings and castings, laminates, surface coatings and the like. In this application, they may be polymerized by themselves or in combination with other ethylenically unsaturated monomers. Examples of other ethylenically unsaturated monomers that may be copolymerized with the compounds of the invention include, among others, maleic anhydride, diethyl maleate, diallyl maleate, diethyl fumarate, diethyl chloromaleate, methyl acrylate, butyl acrylate, methyl methacrylate, styrene, chlorostyrene, alpha-methylstyrene, vinyl chloride, vinylidene chloride, acrylonitrile, methacrylonitrile, vinyl acetate, vinyl chloroacetate, vinyl benzoate, allyl propionate, diallyl phthalate, diallyl succinate, divinyl benzene, butadiene, chloroprene, divinyl phthalate, allyl vinyl phthalate, vinylpyridine, vinyl fluoroacetate, ethylene glycol diacrylate, propylene glycol dimethacrylate, and the like. To obtain the desired insoluble infusible products, it is preferred to employ these dissimilar monomers in amounts varying from .1% to about 70% by weight, and more preferably in amounts varying from 1% to 50% by weight.

The polymerization may be accomplished by heating the monomer or monomers in the presence of a free radical yielding catalyst, and preferably a peroxide polymerization catalyst. Examples of such catalysts include, among others, benzoyl peroxide, tertiary butyl hydroperoxide, barium peroxide, sodium peroxide, tetralin peroxide, acetyl peroxide, acetone peroxide and the like. The amount of the catalyst employed will vary with the various conditions but will generally range from about 2% to about 8%, and more preferably in amounts varying from 2% to 5% by weight.

The temperature used in the polymerization will vary depending upon the type of catalyst selected and the desired molecular weight of the polymer. If high molecular weight polymers are desired, the temperature should be relatively low, e. g. about 50° C. to 150° C. and the catalyst should be one that decomposes to free radicals in the temperature range. If low molecular weight polymers are desired, the temperature should be relatively high, e. g. 150° C. to 300° C. and the catalyst should be one that decomposes to free radicals in that range.

Low molecular weight polymers can also be obtained by use of transfer agents, such as, for example, acetone, diethyl ethers, halogenated hydrocarbons, such as carbon teterachloride, halogenated alcohols, aldehydes and ethers, halogenated acids, such as alpha-bromopropionic acid and esters or anhydrides of such acids, such as propyl trichloroacetate and chloroacetic acid anhydride, acid halides, such as acetyl chloride and chloroacetyl chloride, esters of inorganic acids, such as methyl sulfate, triethyl borate, tributyl phosphate and the like, mercaptans, such as dodecyl mercaptan. The amount of these additives employed will vary depending upon the additive selected and the molecular weight desired, but will generally vary from about 3% to 30% by weight of the monomers being polymerized.

The polymerization may be accomplished in bulk, solvent solution or in aqueous systems, but is preferably accomplished in bulk or in the presence of solvents such as benzene, toluene, xylene and other inert hydrocarbons.

The polymerization may be interrupted before the polymer has become insoluble and infusible, and the intermediate soluble product may be further worked and then the polymerization continued to the insoluble infusible stage.

The polymers produced as above are useful in the preparation of molded articles, such as dishes, food containers, floor tile and the like. The polymer in the soluble stage is particularly useful in the preparation of laminates from glass cloth, cotton fabrics, paper, metal fabrics and the like. They are also useful in the formation of coating compositions, such as enamels, paints and lacquers.

The novel unsaturated amines and their salts are also useful and valuable as curing agents for polyepoxides. Preferred salts for this purpose are their inorganic and organic salts and preferably salts of acids such as, for example, phosphoric acid, sulfuric acid, acetic acid, propionic acid, benzoic acid, chloroacetic acid, benzenesulfonic acid and the like.

Examples of polyepoxides that may be cured with the claimed amines and their salts are given in U. S. 2,633,458.

The polyepoxides may be cured with the claimed unsaturated amines and their salts by merely mixing the two components together. The reaction occurs slowly at temperature as low as about 20° C. and for best results it is best to heat the mixture between about 40° C. and about 200° C. Particularly preferred temperatures range from about 40° C. to about 150° C.

The amount of curing agent employed in the cure of the polyepoxides may vary over a considerable range. Amounts of adduct can range from about 5 parts per 100 parts of polyepoxide up to 40 parts per 100 parts of polyepoxide. Best results are obtained, however, when the adduct is employed in amounts varying from 10 to 30 parts per 100 parts of polyepoxide.

In curing the polyepoxide, it is usually desirable to have the polyepoxide in a mobile condition when the curing agent is added in order to facilitate mixing. The polyepoxides, such as the glycidyl polyether of polyhydric phenols, are generally very viscous to solid materials at ordinary temperature. With those that are liquid, but too viscous for ready mixing, they are either heated to reduce the viscosity, or have a liquid solvent added thereto in order to provide fluidity. Normally solid members are likewise either melted or mixed with a liquid solvent. Various solvents are suitable for achieving fluidity of polyepoxide. These may be volatile solvents which escape from the polyepoxide compositions containing the adduct by evaporation before or during the curing such as ketones like acetone, methyl ethyl ketone, methyl isobutyl ketone, isophorone, etc. esters such as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons, such as trichloropropane, chloroform, etc. To save expense, these active solvents may be used in admixture with aromatic hydocarbons such as benzene, toluene, xylene, etc. and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ a polyepoxide, such as one of the glycidyl polyethers of the dihydric phenol, in admixture with a normally liquid glycidyl polyether of a polyhydric alcohol. In fact, two or more of any of the polyepoxides may be used together as mixtures. In such a case, the amount of the adduct added and commingled is based on the average epoxide equivalent weight of the polyepoxide.

Various other ingredients may be mixed with the polyepoxide subjected to cure with the novel unsaturated amines and their salts including pigments, fillers, dyes, plasticizers, resins, and the like.

The polyepoxides cured with the new unsaturated amines and their salts are useful in the preparation of laminates, coating compositions and castings.

Treatment of the novel unsaturated ethers of the N-substituted alkane polyol amines containing an active hydrogen atom on the amino nitrogen atom with a polycarboxylic acid yields resins of the alkyd-type which possess many interesting and valuable properties. It is assumed in this reaction that the carboxyl groups react both with the hydroxyl group and the amino group to form a polyester-polyamide type molecule. If the reaction with the polybasic acids is conducted in the substantial absence of oxygen, the unsaturated ether linkages will not take part in the initial reaction and the products may be subsequently treated to cause cross-linking between the unsaturated groups. Resins formed in this manner are particularly valuable in the preparation of surface coating compositions as they dry rapidly in air and/or at relatively high temperatures with or without the addition of conventional driers to produce very hard scratch-resistant films.

The polybasic acids to be reacted with the novel unsaturated ethers to produce the polyester-polyamide type products may be exemplified by malonic, glutaric, succinic, suberic, citric, aconitic, tricarballylic, cyclohexanedicarboxylic, maleic, fumaric, itaconic, mesaconic, phthalic, isophthalic, terephthalic, 1,8 - naphthalenic, adipic, sebacic, azelaic, pimelic, chlorosuccinic, bromomaleic, dichlorophthalic, dilatic, dihydracrylic, and bezo-2,4'-dicarboxylic acid.

The preferred polybasic acids to be used in producing these products are the dicarboxylic acids containing from 2 to 12 carbon atoms, such as succinic acid, glutaric acid, maleic acid, phthalic acid, diethylphthalic acid, and the like. Particularly preferred acids are the aromatic dicarboxylic acids containing from 6 to 10 carbon atoms whereas the two carboxyl groups are attached directly to the aromatic ring.

In some cases, it may be desirable to utilize other forms of the acid, such as the acid anhydrides or acid chlorides.

The production of the polyester-polyamide type products may be accomplished by any suitable method. They may be prepared, for example, by mixing the unsaturated ether with the polybasic acid or anhydride and any desired modifying agents and subjecting the resulting mixture to heat. Ordinarily, no catalyst need be employed, but if desired substances, such as p-toluenesulfonic acid, zinc chloride, stannic chloride, calcium acetate, barium acetate, hydrochloric acid, etc., in amounts preferably varying from 0.1% to 5% by weight of the reactants may be employed.

The proportions in which the ether and acid reactants are combined may vary over a considerable range. Ordinarily equimolecular amounts of both reactants give satisfactory results although excellent results are also obtained when 10 to 20% excess of the reactants are employed.

The temperature employed during the reaction may vary over a considerable range depending upon the type of reactants, catalyst, etc. In most cases the temperature will range between about 100° C. and about 300° C. with a preferred range varying between 120° C. and 250° C.

The reaction may be accomplished in the presence or absence of solvents or diluents. If solvents or diluents are employed it is desirable to utilize inert organic compounds, such as benzene, toluene, xylene, cyclohexanone, chloroform, carbon tetrachloride, and the like.

The reaction is accomplished in an inert atmosphere, at least during the initial stages of the process. By an inert atmosphere is meant one substantially devoid of oxygen, such as nitrogen, carbon dioxide, and the like. Atmospheric, superatmospheric or subatmospheric pressures may be used.

The water formed during the reaction may be removed during the reaction or at its completion. It is preferably removed substantially as fast as it is formed therein. The removal of the water may be accomplished by any suitable means, such as distillation, and the like.

As the resulting products are heat-convertible, care should be taken during the reaction to avoid converting the resin to a step beyond that of being fusible. This will occur if the reaction mixture is overheated or heated too long. To avoid such difficulty the course of the reaction is conveniently followed by making determinations of the viscosity and acid number upon samples withdrawn from the reaction mass or by other well known methods. Ordinarily the heating is continued until the viscosity has reached the desired value and the acid number has been reduced to a value between about 5 and 20.

When the reaction is substantially complete as shown by the above-described methods, the inert solvents or diluents, remaining water, uncombined reactants and by-products are preferably removed from the reaction mixture. Removal is conveniently accomplished by vacuum distillation, although fractional distillation, precipitation, and the like may be utilized.

The fusible resins produced by the above-described process may be converted into insoluble, infusible products by subjection to the action of heat or oxygen or both. When treated with oxygen, such as in the application of the resin for surface coatings, it may be desirable to add some siccatives as lead, cobalt or manganese linoleates, to accelerate the curing. The resins are also hardenable by the action of heat as by a baking treatment and for this purpose films of the resins when subject to temperatures of about 80° C. to 150° C. are converted to the final stage of resinification.

The above-noted resins are useful in surface coatings, such as enamels, paints and the like. When employed in this manner, the resins are used with a vehicle and formulated with various ingredients such as other resins, plasticizers, pigments, etc. The resin is also useful for impregnating material such as wood, cloth, paper and the like.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the examples are parts by weight.

*Example 1*

This example illustrates the preparation and properties of N-allyl-1-amino-3-allyloxy-2-propanol.

(a) About 342 parts of allylamine and 15 parts of $BF_3$-ether complex were added to a glass reaction vessel equipped with a stirrer and reflux condenser. About 228 parts of glycidyl allyl ether was then slowly added to this mixture. When all of the glycidyl allyl ether has been added, the mixture was heated to 60° C. to 70° C. for several hours and then allowed to stand overnight. 50 parts of water and 50 parts of sodium carbonate were then added. After stirring for about one-half hour, the mixture was filtered and stabilized at 100° C. and 150 mm. pressure. Fractionation of the residue yielded a water-white liquid boiling at 98° C. to 100° C. at 2 mm. identified as N-allyl-1-amino-3-allyloxy-2-propanol. Percent N found 8.06, calc. 8.19, $d$ 20/D 0.9672, N 20/D 1.4705.

(b) 60 parts of the N-allyl-1-amino-3-allyloxy-2-propanol produced above was combined with 40 parts of maleic anhydride, 5% by weight of benzoyl peroxide and 100 parts of benzene. This mixture was heated at 65° C. for several hours. The white polymer that formed was filtered off. The polymer was insoluble in acetone and did not soften on heating.

The polymer produced above was quite different in properties from a copolymer of maleic anhydride and a monoethylenically unsaturated ether such as N-isopropyl-1-amino-3-allyloxy-2-propanol. In this case, 60 parts of the N-isopropyl-1-amino-3-allyloxy-2-propanol was combined with 40 parts of maleic anhydride and 5% by weight of benzyl peroxide and 100 parts of benzene and the mixture heated at 65° C. The polymer resulting from this preparation was soluble in acetone and softened on heating.

(c) When 100 parts of the glycidyl ether of 2,2-bis-(4-hydroxy phenyl) propane was heated with 25 parts of N-allyl-1-amino-3-allyloxy propanol, the mixture sets up to a hard casting.

Example II

This example illustrates the preparation and properties of N-(allyloxyhydroxypropyl)-1-amino-3-allyloxy-2-propanol.

(a) About 630 parts of 27% solution of ammonium hydroxide and 2 parts of a $BF_3$-ether complex were added to a glass reaction flask equipped with stirrer and reflux condenser. Approximately 230 parts of glycidyl allyl ether were then slowly added to this mixture. When all the glycidyl allyl ether had been added, the reaction mixture was heated at 60° C. to 70° C. for four hours and then allowed to stand overnight. 50 parts of water and 50 parts of sodium carbonate were then added. The mixture was fractionated and there was recovered a waxy solid having a melting point of 50–60° C. and a B. P. of 171–176° C. at 1 mm. It was identified as N-(allyloxyhydroxypropyl)-1-amino-3-allyloxy-2-propanol.

(b) 70 parts of the n-(allyloxyhydroxypropyl)-1-amino-3-allyloxy-2-propanol produced above was combined with 30 parts of styrene, 5% benzoyl peroxide and 100 parts of benzene. This mixture was heated at 65° C. for several hours. The white polymer that formed was then filtered off. The polymer was insoluble in solvents and did not soften on heating.

A related polymer prepared from N-isopropyl-1-amino-3-allyloxy-2-propanol and styrene was soluble in acetone and softened on heating.

(c) When 100 parts of glycidyl ether of 2,2-bis(4-hydroxyphenyl) propane was heated with 25 parts of the above-described N(allyloxyhydroxypropyl) - 1-amino-3-allyloxy-2-propanol, the mixture sets up to a hard casting.

Example III

This example illustrates the preparation and properties of N-carballyloxy-1-amino-3-allyloxy-2-propanol.

(a) About 270 parts of $NH_2COOC_2H_5$ and 15 parts of $BF_3$-ether complex were added to a glass reaction vessel described in Example I. About 114 parts of glycidyl allyl ether was then slowly added to this mixture. When all of the glycidyl allyl ether had been added, the mixture was maintained at 50–60° C. for several hours and then allowed to stand overnight. 50 parts of water and 50 parts of sodium carbonate were then added. After stirring for about one-half hour, the mixture was filtered and stabilized. Fractionation of the residue yields a water-white liquid identified as N-carballyloxy-1-amino-3-allyloxy-2-propanol.

(b) 75 parts of the N-carballoxy-1-amino-3-allyloxy-2-propanol produced above was mixed with 25 parts of acrylonitrile and 5% by weight of benzoyl peroxide and heated to 70° C. The resulting polymer was a hard insoluble infusible product.

Example IV

This example illustrates the preparation and properties of N-(allyloxyethyl)-1-amino-3-allyloxy-2-propanol.

(a) About 303 parts of the allyl ether of ethanol amine and 15 parts of $BF_3$-ether complex were added to a glass reaction vessel equipped with a stirrer and reflux condenser. About 114 parts of gylcidyl allyl ether were then slowly added to this mixture. When all of the glycidyl allyl ether had been added, the mixture was heated to 60° C. to 70° C. for several hours and then allowed to stand. Sodium carbonate was then added to neutralize any acid contained in the mixture. The mixture was then filtered and stabilized at 100° C. and 150 mm. pressure. Fractionation of the residue yielded a water-white liquid identified as N-(allyloxyethyl)-1-amino-3-allyloxy-2-propanol.

(b) 60 parts of the N-(allyloxyethyl)-1-amino-3-allyloxy-2-propanol produced above was combined with 40 parts of diethyl fumarate, 5% by weight of benzoyl peroxide and 100 parts of benzene. This mixture was heated at 65° C. for 6 hours. The white polymer that formed was insoluble in acetone and did not soften on heating.

Example V

This example illustrates the preparation and properties of N-methallyl-1-amino-6-allyloxy-2-hexanol.

(a) About 213 parts of methallylamine and 15 parts of $BF_3$-ether complex were added to a glass reaction vessel equipped with a stirrer and reflux condenser. About 156 parts of 1,2-epoxy-6-hexanol was then slowly added to this mixture. When all of the 1,2-epoxy-6-hexanol had been added, the mixture is maintained at 60° C. for six hours and then allowed to stand at room temperature. After addition of sodium carbonate, the mixture was filtered and stabilized at 100° C. Fractionation of the residue yielded a water-white liquid identified as N-methallyl-1-amino-6-allyloxy-2-hexanol.

(b) 40 parts of the N-methallyl-1-amino-6-allyloxy-2-hexanol produced above was combined with 60 parts of maleic anhydride, 5% by weight of benzoyl peroxide and 100 parts of benzene. This mixture was heated at 65° C. for several hours. The white polymer that formed was insoluble in acetone and did not soften on heating.

Related polymers are obtained by replacing the maleic anhydride in the above process with equal amounts of each of the following: acrylonitrile, ethyl acrylate, dimethyl fumarate and chlorostyrene.

Example VI

This example illustrates the preparation and properties of N-(7-octenyl)-1-amino-3-allyloxy-2-propanol (a) About 320 parts of octenylamine and 15 parts of $BF_3$-ether complex were added to a glass reaction vessel as described in Example I. About 114 parts of glycidyl allyl ether were then slowly added to this mixture. When all of the glycidyl allyl ether had been added, the mixture was heated to 60° C. for several hours and then allowed to stand. Aqueous sodium carbonate was then added and after stirring for one-half hour the mixture was filtered and stabilized at 100° C. and 150 mm. Fractionation of the residue yielded a very viscous liquid identified as N-(7-octenyl)-1-amino-3-allyloxy - 2 - propanol.

(b) About 65 parts of the N-(7-actenyl)-1-amino-3-allyloxy-2-propanol produced above was combined with 35 parts of diallyl phthalate and 7% by weight of benzoyl peroxide and 100 parts of benzene. The mixture was heated at 70° C. The white polymer that formed was filtered off. The polymer was insoluble in acetone and did not soften on heating.

We claim as our invention:

1. An alkenyl ether of an N-substituted alkane polyol amine wherein the substituent on the nitrogen atom possesses a terminal $C=CH_2$ group.

2. An alkenyl ether of an N-alkenyl alkane polyol monoamine wherein the two alkenyl groups contain from 3 to 12 carbon atoms and the alkane polyol monoamine portion of the molecule contains up to 10 carbon atoms.

3. An alkenyl ether of an N-(alkenyloxyalkyl) alkane polyol monoamine wherein the two alkenyl groups contain from 3 to 12 carbon atoms, the alkyl group of the substituent on the nitrogen atom contains up to 6 carbon atoms and the alkane polyol monoamine portion of the molecule contains up to 10 carbon atoms.

4. An alkenyl ether of an N-(alkenyloxyhydroxyalkyl) alkane polyol monoamine wherein the two alkenyl groups contain from 3 to 12 carbon atoms, the alkyl group of the substituent on the nitrogen atom contains up to 6 carbon atoms and the alkane polyol monoamine portion of the molecule contains up to 10 carbon atoms.

5. An alkenyl ether of an N-(carbalkenyloxy) alkanediol monoamine wherein the two alkenyl groups contain from 3 to 12 carbon atoms and the alkanediol monoamine portion of the molecule contains up to 10 carbon atoms.

6. A diethylenically unsaturated compound of the group consisting of (1) monoalkenyl ethers of N-alkenyl alkanediol monoamides, and (2) mono-alkenyl ethers of N-(alkenyloxyhydroxyalkyl) alkanediol monoamines, in (1) and (2) said alkenyl groups and alkyl groups contain up to 6 carbon atoms and the alkanediol portion of the molecule contains from 3 to 8 carbon atoms.

7. N(allyloxyethyl)-1-amino-6-allyloxy-2-hexanol.

8. N(allyloxyethyl)-1-amino-3-allyloxy-2-propanol.

9. N(allyloxyhydroxyproply)-1-amino-3-allyloxy-2-propanol.

10. N-allyl-1-amino-3-allyloxy-2-propanol.

11. N-(carballyloxy)-1-amino-3-allyloxy-2-propanol.

12. An insoluble infusible polymer of the polyethylenically unsaturated ether defined in claim 1.

13. An insoluble infusible copolymer of N-(allyloxyhydroxypropyl)-1-amino-3-allyloxy-2-propanol and a monomer containing a $CH_2=C=$ group.

14. A copolymer as defined in claim 13 wherein the monomer containing the $CH_2=C=$ group is maleic anhydride.

15. A copolymer as defined in claim 13 wherein the monomer containing the $CH_2=C=$ group is diethyl fumarate.

16. A copolymer as defined in claim 13 wherein the monomer containing the $CH_2=C=$ group is acrylonitrile.

References Cited in the file of this patent

UNITED STATES PATENTS

| | | |
|---|---|---|
| 2,497,553 | Long | Feb. 14, 1950 |
| 2,541,088 | Nikawitz | Feb. 13, 1951 |
| 2,631,995 | Bruson | Mar. 17, 1953 |
| 2,676,949 | Morner et al. | Apr. 27, 1954 |
| 2,712,015 | Bruson | June 28, 1955 |
| 2,735,842 | Fluchaire | Feb. 21, 1956 |
| 2,744,098 | Towne | May 1, 1956 |